United States Patent
Paik et al.

(10) Patent No.: US 8,457,253 B2
(45) Date of Patent: Jun. 4, 2013

(54) APPARATUS AND METHOD FOR ESTIMATING A CHANNEL IN A BROADBAND WIRELESS COMMUNICATION SYSTEM

(75) Inventors: Kyung-Hyun Paik, Seoul (KR); Suk-Jin Jung, Gyeonggi-do (KR); Byung-Tae Kang, Seoul (KR)

(73) Assignee: Samsung Electronics Co., Ltd (KR)

(*) Notice: Subject to any disclaimer, the term of this patent is extended or adjusted under 35 U.S.C. 154(b) by 376 days.

(21) Appl. No.: 12/879,358

(22) Filed: Sep. 10, 2010

(65) Prior Publication Data

US 2011/0064170 A1    Mar. 17, 2011

(30) Foreign Application Priority Data

Sep. 16, 2009 (KR) .................. 10-2009-0087424

(51) Int. Cl.
*H03K 9/00* (2006.01)
(52) U.S. Cl.
USPC .......................... 375/316; 375/346
(58) Field of Classification Search
USPC .................. 375/259, 285, 316, 340, 346, 350
See application file for complete search history.

(56) References Cited

U.S. PATENT DOCUMENTS

| | | | |
|---|---|---|---|
| 7,474,611 B2 | 1/2009 | Svensson et al. | |
| 7,647,073 B2 * | 1/2010 | Sung et al. | 455/562.1 |
| 7,711,031 B2 * | 5/2010 | Sadek et al. | 375/144 |
| 8,064,507 B1 * | 11/2011 | Cheng et al. | 375/224 |
| 8,149,905 B1 * | 4/2012 | Cheng et al. | 375/224 |
| 8,300,742 B1 * | 10/2012 | Bromberg et al. | 375/346 |
| 2007/0127582 A1 * | 6/2007 | Lee et al. | 375/260 |

FOREIGN PATENT DOCUMENTS

| | | | |
|---|---|---|---|
| KR | 2008067398 A | * | 7/2008 |
| KR | 1020080071853 | | 8/2008 |

OTHER PUBLICATIONS

Corvaja et al., "Joint Channel and Phase Noise Compensation for OFDM in Fast-Fading Multipath Applications", In: IEEE Transactions on Vehicular Technology, Feb. 2009.

Zhang et al., "Channel Estimation for MC-CDMA with Compensation of Synchronization Errors", Proceedings of IEEE 60th Vehicular Technology Conference, Sep. 26, 2004.

* cited by examiner

*Primary Examiner* — Jean B Corrielus

(74) *Attorney, Agent, or Firm* — The Farrell Law Firm, P.C.

(57) ABSTRACT

Channel estimation in a broadband wireless communication system is provided. A receiver includes a frequency interpolator for interpolating in a frequency axis using at least one of channel estimation values estimated through pilot signals and channel estimation values generated using a time-axis interpolation, a determiner for determining a compensation coefficient to compensate for edge distortion using the channel estimation values estimated through the pilot signals, and a compensator for generating a completed channel estimation value by multiplying a channel estimation value generated by interpolating in the frequency axis, by the compensation coefficient.

22 Claims, 9 Drawing Sheets

APPARATUS AND METHOD FOR ESTIMATING A CHANNEL IN A BROADBAND WIRELESS COMMUNICATION SYSTEM

PRIORITY

The present application claims priority under 35 U.S.C. §119(a) to a Korean patent application filed in the Korean Intellectual Property Office on Sep. 16, 2009, and assigned Serial No. 10-2009-0087424, the entire content of which is incorporated herein by reference.

BACKGROUND OF THE INVENTION

1. Field of the Invention

The present invention relates generally to a broadband wireless communication system, and more particularly, to an apparatus and a method for estimating a channel in the broadband wireless communication system.

2. Description of the Related Art

A transmitter and a receiver in a wireless communication system communicate with each other over a radio channel. According to characteristics of the radio channel, a signal passing through the radio channel may be distorted and deformed. Thus, the receiver measures a magnitude change and a phase change of the signal caused by the radio channel, and detects the signal transmitted by the transmitter using the measurements. Herein, the measurement of the magnitude and phase changes of the signal within the radio channel is referred to as channel estimation.

When utilizing an Orthogonal Frequency Division Multiplexing (OFDM)/Orthogonal Frequency Division Multiple Access (OFDMA) scheme, which is a signal scheme for a physical layer of an advanced communication system, channel estimation mostly uses pilot signals inserted to specific locations. The pilot signals are generally classified as scattered pilots and continual pilots, based on their mapping scheme.

FIG. 1 illustrates an example of a pilot signal pattern in a conventional broadband wireless communication system.

Referring to FIG. 1, pilot signals continuously arranged along the time axis are the continual pilots 110, and pilot signals arranged at intervals along the time axis are the scattered pilots 120. When a channel is estimated using the pilot signals as illustrated FIG. 1, channel values of tones of the pilot signals are determined by the pilot signals and channels values of other tones are determined using interpolation.

The interpolation is conducted in both of a time direction and a frequency direction. The frequency-directional interpolation relies heavily on a recent Discrete Fourier Transform (DFT) based interpolation. The DFT based frequency-directional interpolation can reject considerable noise between Channel Impulse Response (CIR) components apart from each other, which cannot be removed in a Finite Impulse Response (FIR) filter type interpolation, and thus enhance the performance under much multipath delay. With respect to each CIR peak component, the DFT based frequency-directional interpolation enables filtering of the frequency response with sharpness over a possible level in the FIR filtering and narrow bandwidth, thus maximizing noise suppression effect. The DFT based frequency-directional interpolation can directly filter some image components still remaining between the original CIR components, which are not completely removed because of the inaccurate time-directional interpolation in the high-speed mobile reception environment, thus enhancing the reception performance of the high-speed mobile environment. Although the significant CIR component and the image component overlap in the long multipath environment, when their individual peak does not overlap, they can be filtered individually. Thus, it is possible to overcome the theoretical rate regulation according to the time-directional sampling interval by omitting the time-directional interpolation.

However, the output of the DFT based frequency-directional interpolation has a distortion problem called an edge distortion. That is, a sharp rectangular CIR masking of the narrow width based on mask information in the time domain causes overshoot/undershoot distortion in the vicinity of both edges of the frequency-domain signal effective band of a Fast Fourier Transform (FFT) output. In particular, because channel values used in the initial Inverse FFT (IFFT) process have zero values in the both sides of the guard band interval, they cause considerable dispersion around the time domain CIR component. In this respect, the sharp CIR masking increases edge distortion. The edge distortion ultimately results in error in Likelihood Log Ratio (LLR) calculation in the demapping process. Consequently, the decoding performance of the receiver is ultimately degraded.

SUMMARY OF THE INVENTION

To address at least the above-discussed deficiencies of the prior art, it is an aspect of the present invention to provide an apparatus and a method for estimating a channel in a broadband wireless communication system.

Another aspect of the present invention is to provide an apparatus and a method for reducing edge distortion when a DFT based interpolation scheme is applied in a broadband wireless communication system.

Another aspect of the present invention is to provide an apparatus and a method for expanding a channel estimation value to a guard band before frequency-axis interpolation is applied to channel estimation values in a broadband wireless communication system.

Another aspect of the present invention is to provide an apparatus and a method for determining a compensation coefficient to compensate for edge distortion after frequency-axis interpolation of channel estimation values in a broadband wireless communication system.

In accordance with an aspect of the present invention, an apparatus of a receiver in a broadband wireless communication system is provided. The apparatus includes a frequency interpolator for interpolating in a frequency axis using at least one of channel estimation values estimated through pilot signals and channel estimation values generated using a time-axis interpolation; a determiner for determining a compensation coefficient to compensate for edge distortion using the channel estimation values estimated through the pilot signals, the edge distortion indicating overshoot/undershoot distortion around both edges of an effective band; and a compensator for generating a completed channel estimation value by multiplying the channel estimation value generated by interpolating in the frequency axis, by the compensation coefficient.

In accordance with another aspect of the present invention, an operating method of a receiver in a broadband wireless communication system is provided. The method includes interpolating in a frequency axis using at least one of channel estimation values estimated through pilot signals and channel estimation values generated using a time-axis interpolation; determining a compensation coefficient to compensate for edge distortion using the channel estimation values estimated through the pilot signals, the edge distortion indicating overshoot/undershoot distortion around both edges of an effective band; and generating a completed channel estimation value by multiplying the channel estimation value generated by interpolating in the frequency axis, by the compensation coefficient.

Other aspects, advantages, and salient features of the invention will become apparent to those skilled in the art from the following detailed description, which, taken in conjunction with the annexed drawings, describes various embodiments of the present invention.

BRIEF DESCRIPTION OF THE DRAWINGS

For a more complete understanding of the present disclosure and its advantages, reference is now made to the following description taken in conjunction with the accompanying drawings, in which like reference numerals represent like parts, wherein.

Throughout the drawings, like reference numerals will be understood to refer to like parts, components, and structures.

DETAILED DESCRIPTION OF EMBODIMENTS OF THE INVENTION

Various embodiments of the present invention will be described herein below with reference to the accompanying drawings. In the following description, well-known functions or constructions are not described in detail to avoid obscuring the invention in unnecessary detail.

Certain embodiments of the present invention provide a channel estimation method using a DFT based interpolation scheme, which minimizes edge distortion in a broadband wireless communication system, e.g., an Orthogonal Frequency Division Multiplexing (OFDM)/Orthogonal Frequency Division Multiple Access (OFDMA) wireless communication systems.

Figure 1:
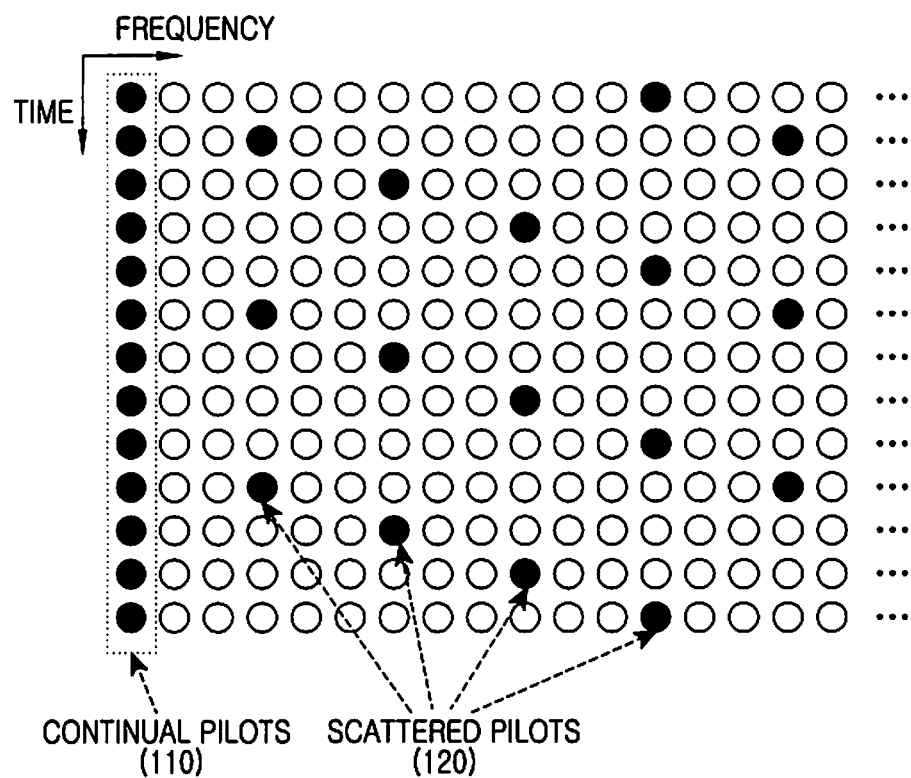
FIG. 1 illustrates an example of a pilot signal pattern in a broadband wireless communication system.
Figure 2:
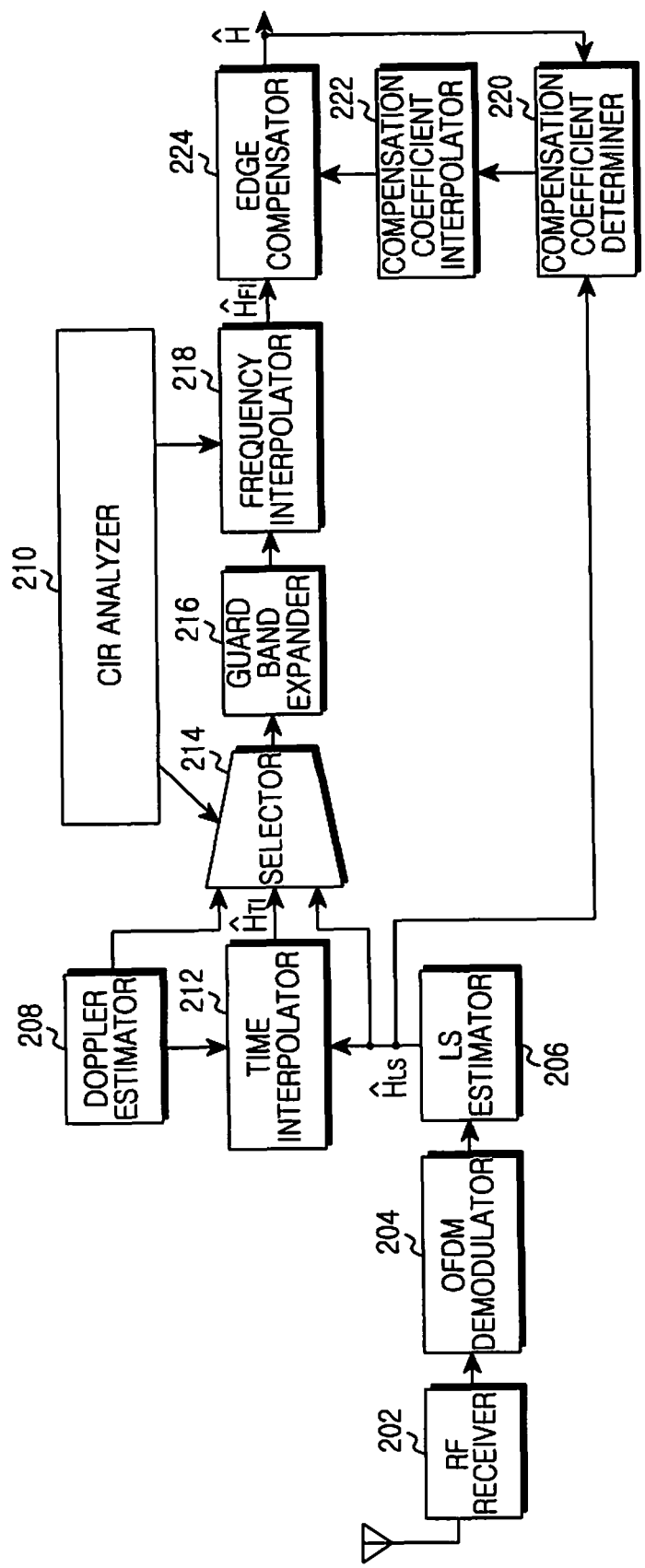
FIG. 2 illustrates a receiver in a broadband wireless communication system according to an embodiment of the present invention.

FIG. 2 is a block diagram of a receiver in a broadband wireless communication system according to an embodiment of the present invention.

Referring to FIG. 2, the receiver includes a Radio Frequency (RF) receiver 202, an OFDM demodulator 204, a Least Square (LS) estimator 206, a Doppler estimator 208, a CIR analyzer 210, a time interpolator 212, a selector 214, a guard band expander 216, a frequency interpolator 218, a compensation coefficient determiner 220, a compensation coefficient interpolator 222, and an edge compensator 224.

The RF receiver 202 down-converts an RF signal received via antenna, to a baseband signal. The OFDM demodulator 204 splits the baseband signal to OFDM symbols and restores signals mapped into the frequency domain through FFT.

Figure 3:
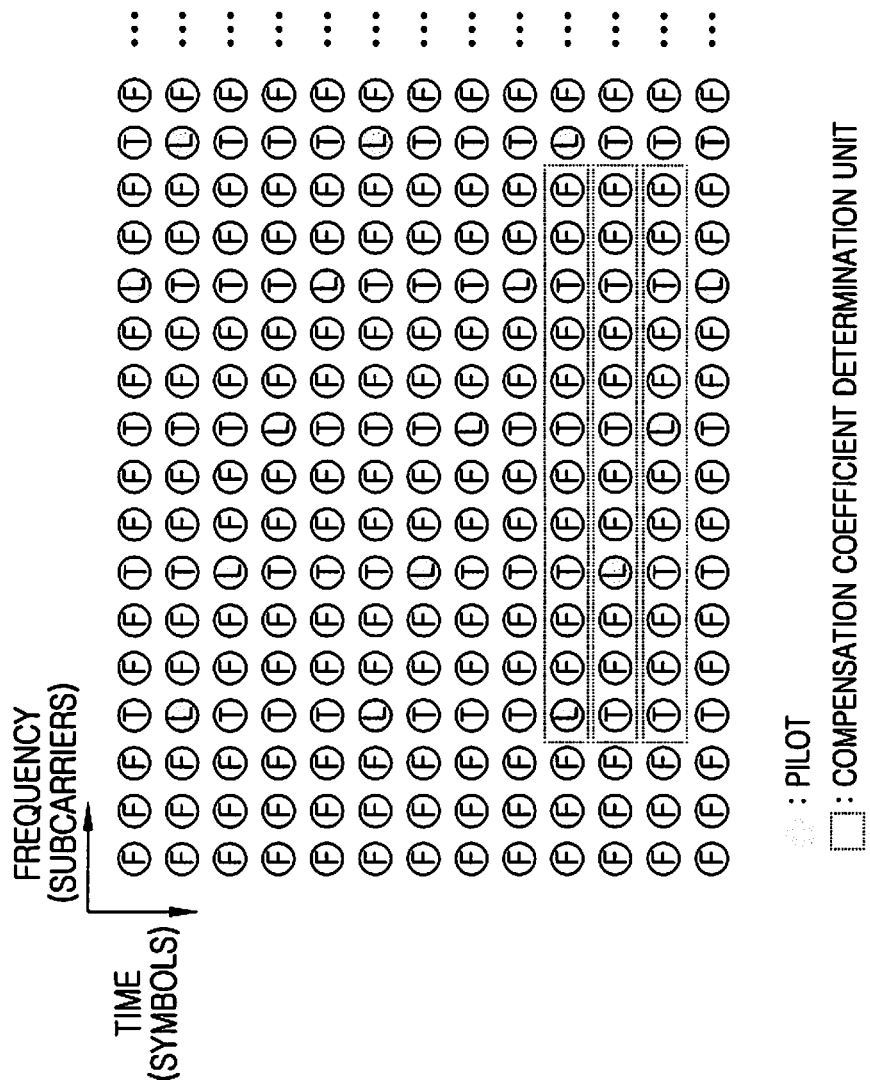
FIG. 3 illustrates a time point for determining channel estimation values in the broadband wireless communication system according to an embodiment of the present invention.

The LS estimator 206 calculates an LS channel estimation value $\hat{H}_{LS}$ using pilot signals of the signals. That is, the LS estimator 206 calculates the channel estimation value $\hat{H}_{LS}$ of tones including the pilot signals. For example, when the pilot signals are located as illustrated in FIG. 3, channel estimation values marked by 'L' are produced. For example, the LS estimator 206 calculates the channel estimation value based on Equation (1).

$$\hat{H}_{LS,k} = Y_k / P_k \qquad (1)$$
$$= (H_k X_k + N_k)/P_k$$

In Equation (1), $\hat{H}_{LS,k}$ denotes the LS channel estimation value for a k-th subcarrier, $Y_k$ denotes a receive signal for the k-th subcarrier, $P_k$ denotes a pilot signal value carried by the k-th subcarrier, $H_k$ denotes a channel value for the k-th subcarrier, $X_k$ denotes a value of the signal carried by the k-th subcarrier, and $N_k$ denotes noise for the k-th subcarrier.

The Doppler estimator 208 estimates the Doppler frequency of the channel. The Doppler estimator 208 provides the estimation result of the Doppler frequency to the time interpolator 212 and the selector 214. The CIR analyzer 210 generates mask information locating the significant CIR peak component and a certain margin region around the CIR peak in order to remove noise and the image components, such that only the CIR components are taken. The CIR analyzer 210 provides the mask information to the frequency interpolator 218. The CIR analyzer 210 determines whether the significant CIR peak component and the image component overlap in the LS channel estimation result not passing through the time-directional interpolation, and controls the output of the selector 214 according to the determination result.

The time interpolator 212 calculates channel estimation values $\hat{H}_{TI}$ of tones not including the pilot signal in the subcarrier carrying the pilot signal, using the channel estimation values $\hat{H}_{LS}$ of the tones carrying the pilot signal. That is, the time interpolator 212 calculates the channel estimation values $\hat{H}_{TI}$ between the channel estimation values calculated by the LS estimator 206 by interpolating the channel estimation values $\hat{H}_{LS}$ calculated by the LS estimator 206 in the time axis. For example, when the pilot signals are located as illustrated in FIG. 3, the channel estimation values marked by 'T' are calculated through the time interpolation.

For example, the time interpolator 212 interpolates in the time axis through FIR filtering and low frequency band filtering. Accordingly, to flatten within the Doppler spectrum of the receive signal, to suppress the noise in the outskirts of the Doppler spectrum, and to prevent aliasing, the time interpolator 212 selects a filter of the frequency response that drops as sharply as possible according to the Doppler frequency estimated by the Doppler estimator 208.

The selector 214 selectively outputs the time-interpolated channel estimation values $\hat{H}_{TI}$ or the LS channel estimation values $\hat{H}_{LS}$ according to a range of the interpolation to generate other channel estimation values from the LS channel estimation values $\hat{H}_{LS}$. More specifically, when both of the time interpolation and the frequency interpolation are performed, the selector 214 outputs the channel estimation values $\hat{H}_{TI}$ fed from the time interpolator 212. When only the frequency interpolation is performed, the selector 214 outputs the LS channel estimation values $\hat{H}_{LS}$ fed from the LS estimator 206. The output is selected using the Doppler frequency estimation result and the determination result of the superposition between the CIP peak component and the image component provided from the CIR analyzer 210.

The guard band expander 216 expands the signal up to the guard band by inserting the channel estimation value into the guard band, according to the analysis result of the CIR analyzer 210.

More specifically, according to the analysis result, when the multipath component of the channel is less than a threshold, the guard band expander 216 inserts the channel estimation value into the guard band. Accordingly, the guard band expander 216 inserts an average value of the channel estimation values of the subcarriers within a certain range of the guard band, or inserts the channel estimation value of an outermost subcarrier of an effective band. When a timing offset exists in the FFT operation of the OFDM demodulator 204, the phase of the channel estimation values varies in proportion to the subcarrier index. Therefore, the guard band expander 216 removes the phase value by considering the time offset, before the average value is calculated, and assigns the phase value, when the channel estimation value is inserted to the guard band. For example, the guard band expander 216 determines the channel estimation value to be inserted into the guard band based on Equation (2).

$$\hat{H}_{FI_{in},k_{out}} = \underset{k_{in} \in P_{in}}{AVG} \left\{ \hat{H}_{FI_{in},k_{in}} \cdot \exp\left[-j2\pi\left(k_{in} - \frac{N_{SC}}{2}\right) \cdot \frac{\alpha}{N}\right] \right\} \cdot \exp\left[j2\pi\left(k_{out} - \frac{N_{SC}}{2}\right) \cdot \frac{\alpha}{N}\right], k_{out} \in P_{out} \quad (2)$$

In Equation (2), $\hat{H}_{FI_{in},k_{out}}$ denotes the channel estimation value to be inserted into the k-th subcarrier in the guard band, $k_{in}$ denotes the k-th subcarrier in the effective band, $P_{in}$ denotes a set of subcarrier indexes carrying the outermost pilot signal in the effective band, $\hat{H}_{FI_{in},k_{in}}$ denotes the channel estimation value of the k-th subcarrier in the effective band, $N_{SC}$ denotes the number of subcarriers, N denotes the FFT size, $\alpha$ denotes the timing offset of the FFT operation, and $P_{out}$ denotes a subcarrier index to include the pilot signal in case of the effective band in the guard band.

In Equation (2), when the time interpolation is omitted and the selector 214 selects the output of the LS estimator 206, $\hat{H}_{FI_{in},k_{in}}$ is the output from the LS estimator 206. When the time interpolation is executed and the selector 214 selects the output of the time interpolator 212, $\hat{H}_{FI_{in},k_{in}}$ is the output from the time interpolator 212.

This guard band expansion removes the rectangular windowing effect caused by the guard band in the IFFT input stage of the DFT based frequency-directional interpolation, and notably reduces the dispersion degree of the time domain CIR component of the IFFT output stage. Consequently, the CIR loss also reduces according to the CIR windowing of the narrow width. Ultimately, the distortion in the edges is drastically reduced.

The frequency interpolator 218 calculates channel estimation values $\hat{H}_{FI}$ of the tones in the subcarriers of which the channel estimation value is not yet determined, using the channel estimation values provided from the guard band expander 216.

Specifically, the frequency interpolator 218 calculates the other channel estimation values $\hat{H}_{FI}$ in the frequency axis by interpolating the channel estimation values fed from the guard band expander 216 in the frequency axis. For example, when the pilot signals are located as illustrated in FIG. 3, the channel estimation values marked by 'F' are yielded through the frequency interpolation. However, when the time interpolation is omitted, the channel estimation values marked by both 'F' and 'T' are yielded through the frequency interpolation.

More specifically, the frequency interpolator 218 converts the channel estimation values fed from the guard band expander 216 to a time-domain signal. The time-domain signal iterates a number of times corresponding to the interval of the subcarriers having the channel value input to the frequency interpolator 218. Thus, the frequency interpolator 218 locates the image components due to the aliasing based on the analysis result of the CIR analyzer 210, distinguishes the noise component, and performs the CIR windowing, thereby extracting only the substantially significant CIR component.

The frequency interpolator 218 converts the CIR-windowed time-domain signal back to the frequency-domain signal. For example, when the pilot signals are located as illustrated in FIG. 3, the frequency interpolator 218 interpolates in the frequency axis based on Equation (3).

$$\hat{H}_{FI} = 3 \cdot FWF^{-1} \hat{H}_{TI}$$

$$\hat{H}_{FI} = 12 \cdot FWF^{-1} \hat{H}_{LS} \quad (3)$$

In Equation (3), $\hat{H}_{FI}$ denotes the frequency-interpolated channel estimation values, F denotes an FFT operation matrix, W denotes a CIR windowing matrix, $\hat{H}_{TI}$ denotes time-interpolated channel estimation values, and $\hat{H}_{LS}$ denotes the LS channel estimation values. When the time interpolation is performed, the first equation including $\hat{H}_{TI}$ of Equation (3) is used. When the time interpolation is omitted, the second equation including $\hat{H}_{LS}$ of Equation (3) is used.

The compensation coefficient determiner 220 determines a compensation coefficient for compensating for the edge distortion using the LS channel estimation values $\hat{H}_{LS}$ provided from the LS estimator 206. The compensation coefficient determiner 220 determines compensation coefficients per OFDM symbol, and determines one compensation coefficient per section divided based on the pilot signal within one OFDM symbol. For example, when the pilots are located as illustrated in FIG. 3, one compensation coefficient is determined per section drawn by the dotted lines. That is, there are as many compensation coefficients determined per OFDM symbol as there are pilot signals in the OFDM symbol. Because the location of the pilot signal in each section varies per OFDM symbol, the normalization effect in the frequency axis arises. Because of the normalization effect, a problem that the compensation coefficient do not updated in the multipath environment, where nulls frequently occur in a channel frequency response, is prevented.

The compensation coefficient determiner 220 uses the LS channel estimation values $\hat{H}_{LS}$ obtained from the pilot signal in the corresponding OFDM symbol, and the compensation coefficients determined in the previous OFDM symbol. That is, the compensation coefficient determiner 220 determines an error value using a difference between the LS channel estimation value and the completed channel estimation value obtained from the previous OFDM symbol, and updates the compensation coefficient determined in the previous OFDM symbol using the error value. For example, the compensation coefficient determiner 220 determines the compensation coefficients based on Equation (4).

$$C_{n,k_p/12} = C_{n-1,k_p/12} + \mu(\hat{H}_{LS,n,k_p} - T_{n-1,k_p} \cdot \hat{H}_{FI,n,k_p}) \cdot \hat{H}_{FI,n,k_p}^*, k_p \in P \quad (4)$$

In Equation (4), $C_{n,k_p/12}$ denotes the compensation coefficient of a section including a $k_p$-th subcarrier carrying a pilot signal in an n-th symbol, μ denotes a weight of an error value, $\hat{H}_{LS,n,k_p}$ denotes the LS channel estimation value of the $k_p$-th subcarrier carrying the pilot signal in the n-th symbol, $T_{n-1,k_p}$ denotes a compensation coefficient of the $k_p$-th subcarrier in an (n−1)-th symbol, $\hat{H}_{FI,n,k_p}$ denotes a frequency-interpolated channel estimation value of the $k_p$-th subcarrier carrying the pilot signal in the n-th symbol, $k_p$ denotes an index of the subcarrier carrying the pilot signal, and P denotes a set of the subcarriers carrying the pilot signal.

The compensation coefficient interpolator 222 identifies the compensation coefficients determined by the compensation coefficient determiner 220 as the compensation coefficients at the center of the corresponding section, and calculates compensation coefficients in the other sections by interpolating the compensation coefficients at the center. At this time, the interpolation is a linear interpolation, and extrapolation is applied to the compensation values for the outermost subcarrier. For example, the compensation coefficient interpolator 222 calculates the compensation coefficients based on Equation (5).

$$T_{n,k} = C_{n,k/12}, \; k \in 12m + 6$$
$$= T_{n,j} + (k - j) \cdot (T_{n,j+12} - T_{n,j})/12, \; k \notin 12m + 6 \text{ and}$$
$$j = 12 \cdot \text{floor}[(k - 6)/12] + 6$$
(5)

In Equation (5), $T_{n,k}$ denotes the compensation coefficient of the k-th subcarrier in the n-th symbol, $C_{n,k/12}$ denotes the compensation coefficient of the section including the k-th subcarrier in the n-th symbol, and m, which is 0 or a positive integer, denotes an index of the frequency section.

The edge compensator 224 compensates for edge distortion by multiplying the channel estimation values $\hat{H}_{FI}$ output from the frequency interpolator 218 by the compensation coefficient output from the compensation coefficient interpolator 222. The compensation coefficient is a weight corresponding to an inverse number of the response characteristics of the edge distortion. That is, the edge compensator 224 compensates for the distortion based on Equation (6).

$$\hat{H}_{n,k} = T_{n-1,k} \cdot \hat{H}_{FI,n,k}$$
(6)

In Equation (6), $\hat{H}_{n,k}$ denotes a completed channel estimation value of the k-th subcarrier in the n-th symbol, $T_{n,k}$ denotes the compensation coefficient of the k-th subcarrier in the n-th symbol, and $\hat{H}_{FI,n,k}$ denotes the frequency-interpolated channel estimation value of the k-th subcarrier in the n-th symbol.

Although the receiver illustrated in FIG. 2 has been described above including the guard band expander 216, the compensation coefficient determiner 220, the compensation coefficient interpolator 222, and the edge compensator 224, the operation of the guard band expander 216 can be omitted, or the operations of the compensation coefficient determiner 220, the compensation coefficient interpolator 222, and the edge compensator 224 can be omitted. For example, when a multipath component of a channel exceeds a threshold, the guard band expander 216 bypasses the input signal. Further, a receiver excluding the guard band expander 216 can be constructed by assuming the multipath component of the channel to be greater than the threshold.

Figure 4:
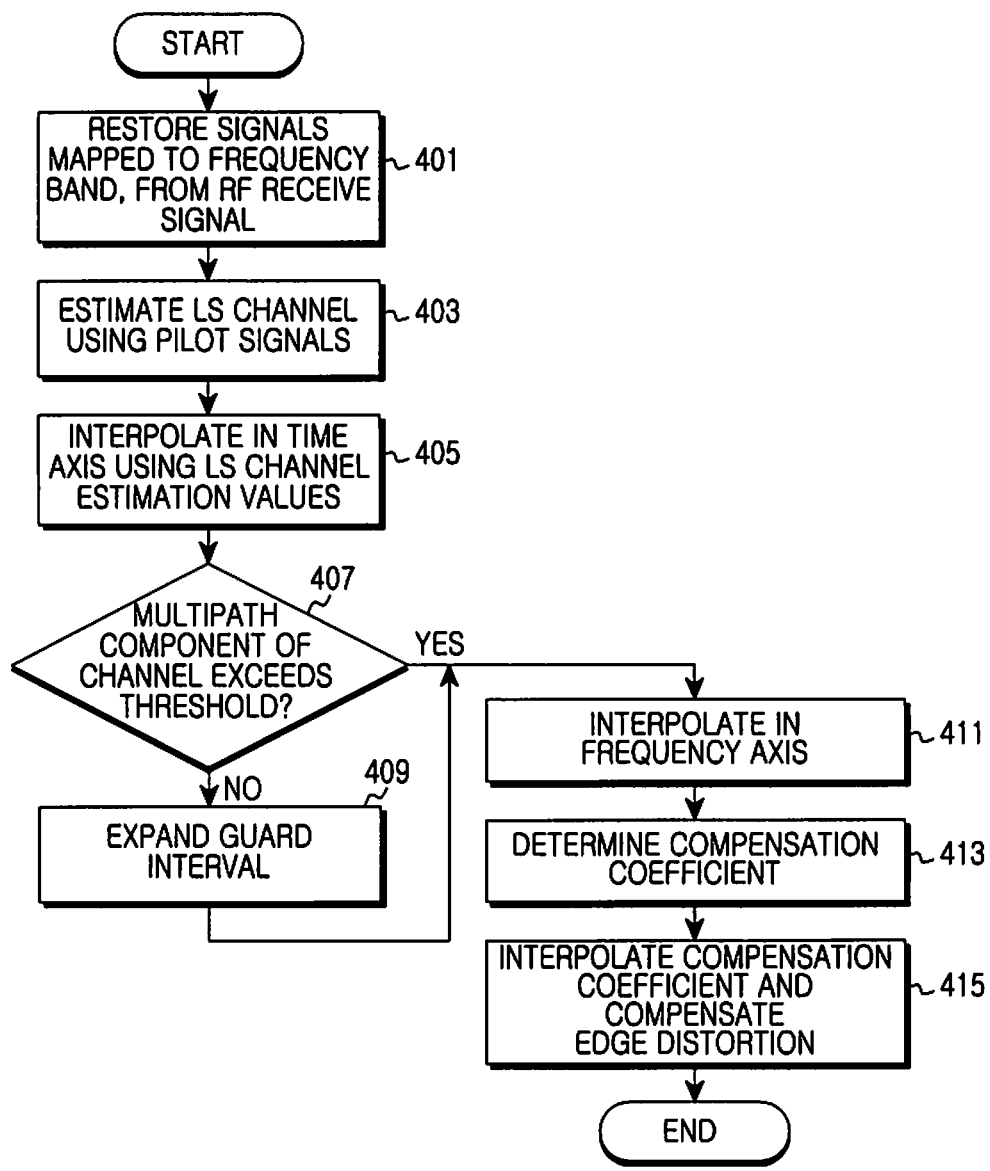
FIG. 4 illustrates an operation of a receiver in a broadband wireless communication system according to an embodiment of the present invention.

FIG. 4 illustrates an operation of a receiver in a broadband wireless communication system according to an embodiment of the present invention. Specifically, FIG. 4 illustrates selective guard band expansion based on an amount of a multipath component of a channel.

Referring to FIG. 4, in step 401, the receiver restores the signals mapped to the frequency band, from the RF receive signal received over the antenna. That is, the receiver down-converts the RF receive signal to the baseband signal, splits the baseband signal into the OFDM symbols, and restores the signals mapped to the frequency domain through the FFT operation.

In step 403, the receiver calculates the LS channel estimation value $\hat{H}_{LS}$ using the pilot signals of the signals. That is, the receiver calculates the channel estimation value $\hat{H}_{LS}$ of the tones including the pilot signals. For example, when the pilot signals are located as illustrated in FIG. 3, the channel estimation values marked by 'L' are calculated. For example, the receiver calculates the channel estimation value based on Equation (1).

In step 405, the receiver calculates the channel estimation values $\hat{H}_{TI}$ of the tones not including the pilot signal, in the subcarrier carrying the pilot signal using the LS channel estimation values $\hat{H}_{LS}$. More specifically, by interpolating the LS channel estimation values $\hat{H}_{LS}$ in the time axis, the receiver calculates the channel estimation values $\hat{H}_{TI}$ between the LS channel estimation values $\hat{H}_{LS}$. For example, when the pilot signals are located as illustrated in FIG. 3, the channel estimation values marked by 'T' are calculated through the time interpolation. For example, the receiver interpolates in the time axis through the FIR filtering and the low frequency band filtering.

In step 407, the receiver determines whether the multipath component of the channel exceeds a threshold. That is, the receiver calculates the amount of the multipath component by analyzing the channel estimation values obtained through the time interpolation, and determines whether the multipath component amount of the channel exceeds the threshold. When the multipath component amount of the channel does not exceed the threshold, the receiver expands the channel estimation value up to the guard band by inserting the channel estimation value into the guard band in step 409. The receiver inserts the average value of the channel estimation values of the subcarriers within the certain range close to the guard band, or inserts the channel estimation value of the outermost subcarrier of the effective band. When the timing offset exists in the FFT operation in step 401, the phase of the channel estimation values varies in proportional to the subcarrier index. Hence, the receiver removes the phase value before the average value is calculated, and assigns the phase value when the channel estimation value is inserted to the guard band. For example, the receiver determines the channel estimation value to be inserted into the guard band based on Equation (2).

When the multipath component amount of the channel exceeds the threshold, or after step 409, in step 411, the receiver calculates the channel estimation values $\hat{H}_{FI}$ of the tones in the subcarriers of which the channel estimation is not determined. By interpolating the channel estimation values expanded to the guard band in the frequency axis, the receiver calculates the other channel estimation values $\hat{H}_{FI}$ in the frequency axis. When not performing step 409, the receiver interpolates the time-interpolated channel estimation values in the frequency axis. For example, when the pilot signals are located as illustrated in FIG. 3, the channel estimation values marked by 'F' are obtained through the frequency interpolation. When the time interpolation is omitted, the channel estimation values marked by 'F' and 'T' are both calculated through the frequency interpolation.

More specifically, the receiver converts the expanded channel estimation values to the time-domain signal. Thereafter, the receiver locates the image components due to the aliasing, identifies the noise components, and performs the CIR windowing so as to extract only the substantially significant CIR components. Next, the receiver converts the CIR-windowed time-domain signal back to the frequency-domain signal. For example, the receiver interpolates in the frequency axis based on Equation (3).

In step 413, the receiver determines the compensation coefficient to compensate for the edge distortion using the LS channel estimation values $\hat{H}_{LS}$ generated in step 403. The receiver determines the compensation coefficients per OFDM symbol, and determines one compensation coefficient per section divided based on the pilot signal in one OFDM symbol. For example, when the pilots are located as illustrated in FIG. 3, one compensation coefficient is determined per section drawn by the dotted lines. The receiver uses the LS channel estimation values $\hat{H}_{LS}$ obtained from the pilot signal in the corresponding OFDM symbol and the compensation coefficients determined in the previous OFDM symbol. That is, the receiver determines the error value using a difference between the LS channel estimation value and the completed channel estimation value obtained from the previous OFDM symbol, and updates the compensation coefficient determined in the previous OFDM symbol using the error value. For example, the receiver determines the compensation coefficients based on Equation (4).

In step 415, the receiver identifies the compensation coefficients as the compensation coefficients at the center of the corresponding section, and calculates the compensation coefficients in the other sections by interpolating the identified compensation coefficients at the center. At this time, the interpolation is linear interpolation, and extrapolation is applied to the compensation values for the outermost subcarrier. For example, the receiver calculates the compensation coefficients based on Equation (5).

The receiver compensates for the edge distortion by multiplying the frequency-interpolated channel estimation values $\hat{H}_{FI}$ by the compensation coefficient. The compensation coefficient is a weight corresponding to an inverse number of the response characteristics of the edge distortion. That is, the receiver compensates for the distortion based on Equation (6).

Although the operation of the receiver in FIG. 4 is described above as including interpolation of the time axis in step 405, in an alternative embodiment, the interpolation of the time axis in step 405 can be omitted. In this case, the receiver interpolates in the frequency axis using the LS channel estimation values in step 411.

Figure 5:
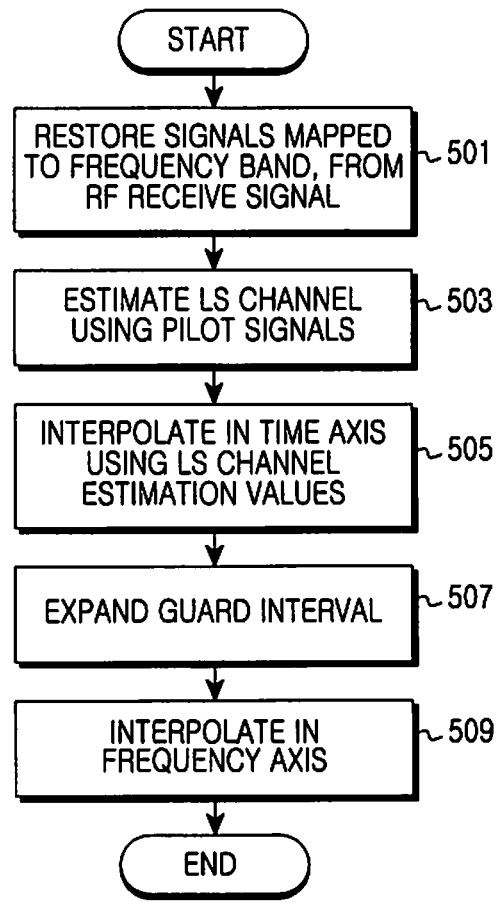
FIG. 5 illustrates an operation of a receiver in a broadband wireless communication system according to another embodiment of the present invention.

FIG. 5 illustrates an operation of a receiver in a broadband wireless communication system according to another embodiment of the present invention. Specifically, in FIG. 5, only guard band expansion is performed.

In FIG. 5, steps 501 to 505 are identical to steps 401 to 405 of FIG. 4, and steps 507 and 509 are identical to steps 409 and 411 of FIG. 4. Accordingly, a repetitive description of the steps will not be provided herein.

Although the operation of the receiver in FIG. 5 is illustrated as including interpolation of the time axis in step 505, in an alternative embodiment, the interpolation of the time axis in step 505 can be omitted. In this case, the receiver interpolates in the frequency axis using the LS channel estimation values in step 509.

Figure 6:
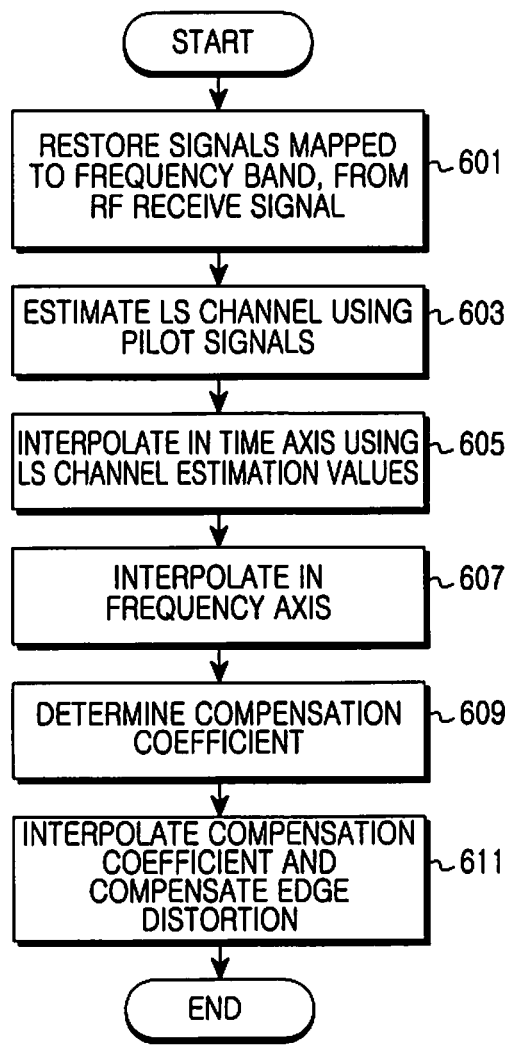
FIG. 6 illustrates an operation of a receiver in a broadband wireless communication system according to another embodiment of the present invention.

FIG. 6 illustrates an operation of a receiver in a broadband wireless communication system according to another embodiment of the present invention. Specifically, in FIG. 6, only edge distortion is compensated.

In FIG. 6, steps 601 to 605 are identical to steps 401 to 405 of FIG. 4, and steps 607 to 611 are identical to steps 411 to 415, respectively, of FIG. 4. Accordingly, a repetitive description of the steps will not be provided herein.

Although the operation of the receiver in FIG. 6 is illustrated as including interpolation of the time axis in step 605, in an alternative embodiment, the time-axis interpolation in step 605 can be omitted. In this case, the receiver interpolates in the frequency axis using the LS channel estimation values in step 607.

Figure 7:
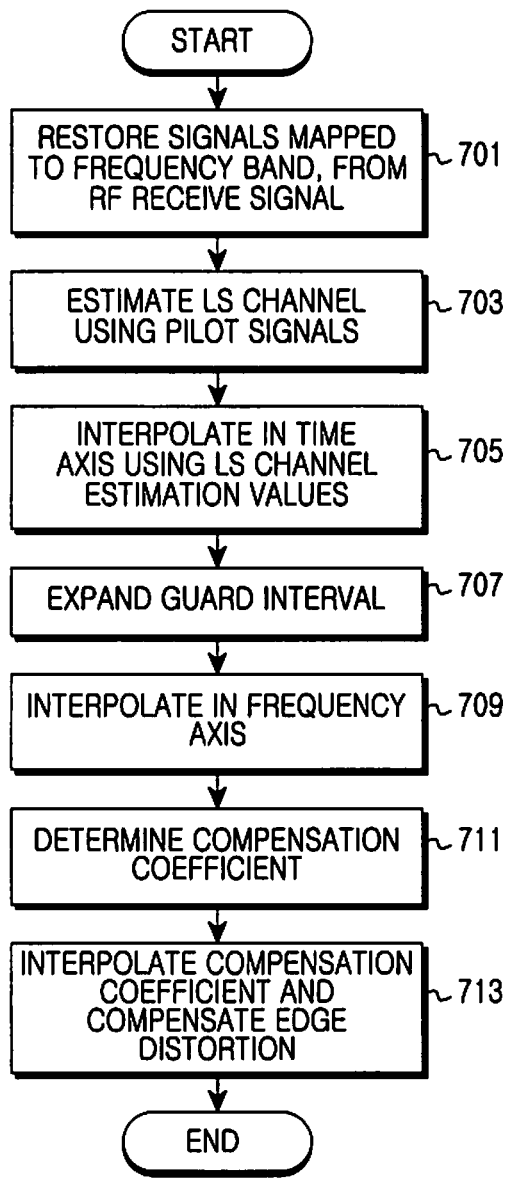
FIG. 7 illustrates an operation of a receiver in a broadband wireless communication system according to another embodiment of the present invention.

FIG. 7 illustrates an operation of a receiver in a broadband wireless communication system according to another embodiment of the present invention, wherein both guard band expansion and edge distortion compensation are carried out, regardless of an amount of multipath component of a channel.

In FIG. 7, steps 701 to 705 are identical to steps 401 to 405 of FIG. 4, and steps 707 to 713 are identical to steps 409 to 415, respectively, of FIG. 4. Accordingly, a repetitive description of the steps will not be provided herein.

Although the operation of the receiver in FIG. 7 is illustrated as including interpolation of the time axis in step 705, in an alternative embodiment, the time-axis interpolation in step 705 can be omitted. In this case, the receiver interpolates in the frequency axis using the LS channel estimation values in step 709.

Figure 8:
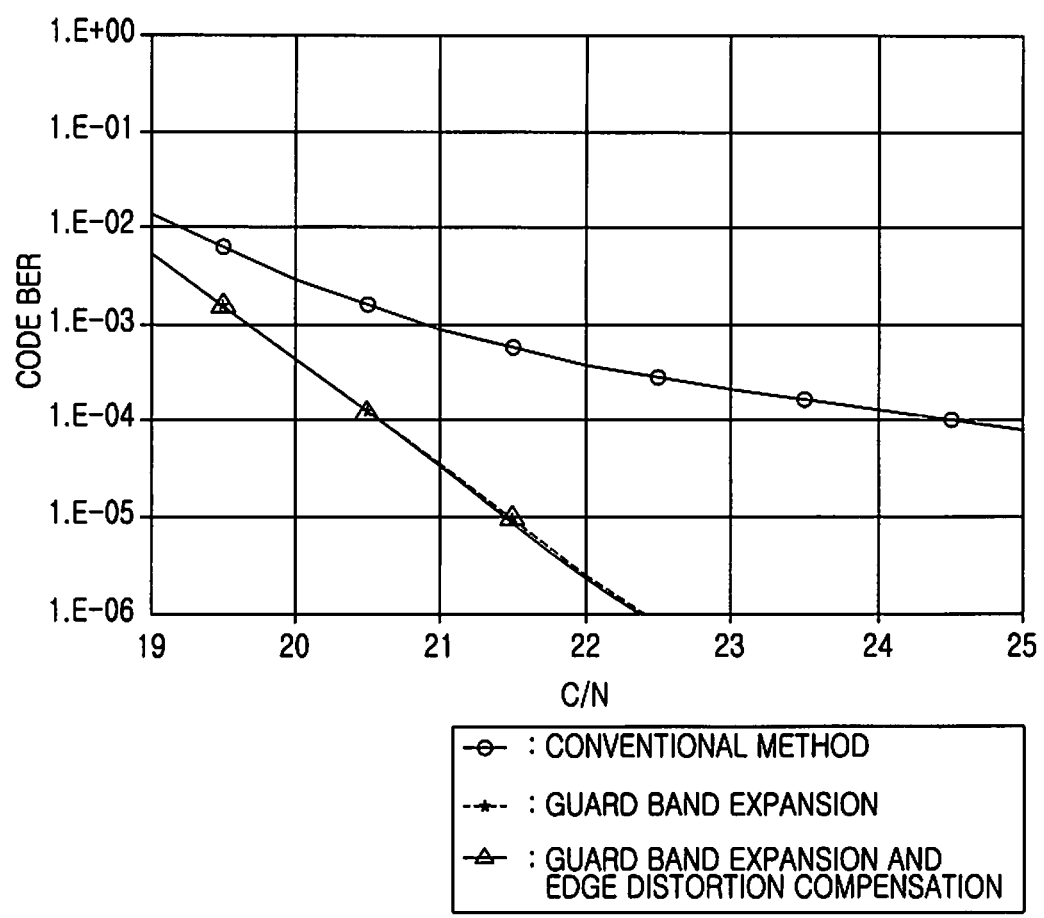
FIGS. 8 and 9 illustrate performance characteristics of a broadband wireless communication system according to an embodiment of the present invention.
Figure 9:
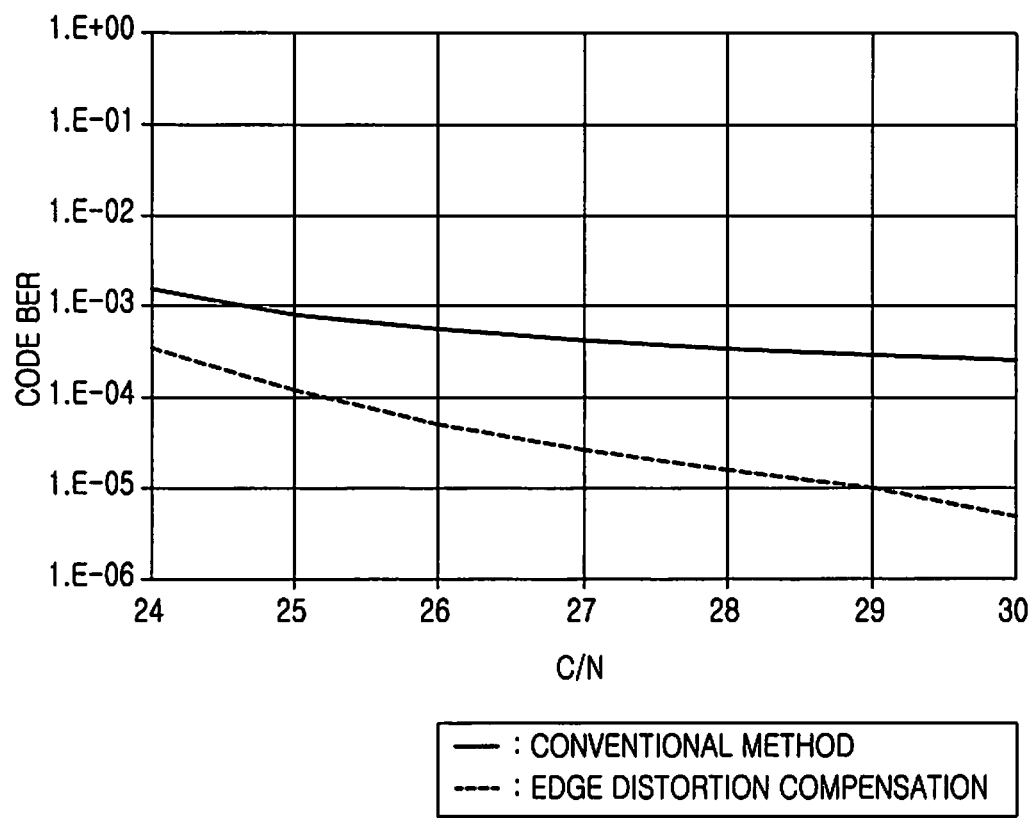

FIGS. 8 and 9 illustrate performance characteristics of a broadband wireless communication system according to an embodiment of the present invention. More specifically, FIGS. 8 and 9 illustrate graphs plotting simulation results of a conventional channel estimation method and a channel estimation method in accordance with an embodiment of the present invention. In the simulation, an 8K mode Digital Video Broadcasting-Terrestrial (DVB-T) signal of 8 MHz bandwidth is used, an FFT size is 8192, there are 6817 subcarriers, and a length rate of a guard interval and an effective interval is set to ¼.

FIG. 8 compares the performance of the conventional method, the performance of an embodiment of the present invention wherein only guard band expansion is applied, and the performance of an embodiment of the present invention wherein both of the guard band expansion and edge distortion compensation are applied, with respect to the transmit signal of 64 Quadrature Amplitude Modulation (QAM) and 7/8 code rate in an Additive White Gaussian Noise (AWGN) environment.

FIG. 9 compares the performance of the conventional method and the performance of edge distortion compensation of an embodiment of the present invention with respect to the transmit signal of 64 QAM and 3/4 code rate in an equal power 2-path channel environment with the delay 212.8 us.

Referring to FIGS. 8 and 9, by virtue of the channel estimation method which selectively applies the guard band expansion according to the channel environment analysis and applies the edge distortion compensation to the DFT based frequency-directional interpolator output after the edge distortion, the performance degradation due to the edge distortion is greatly reduced and the burden of additional hardware ends up in a complex multiplier, a memory for ¹⁄₁₂ symbol, and a linear interpolator.

In a broadband wireless communication system, before the channel estimation values are interpolated in the frequency axis, the channel estimation value is expanded to the guard band and the compensation coefficient to compensate for the edge distortion is applied. Therefore, more accurate channel estimation result can be attained.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A receiver apparatus in a wireless communication system, the apparatus comprising:
   a frequency interpolator for interpolating in a frequency axis using at least one of channel estimation values estimated through pilot signals and channel estimation values generated using a time-axis interpolation;
   a determiner for determining at least one compensation coefficient to compensate for edge distortion using the channel estimation values estimated through the pilot signals, wherein the edge distortion indicates distortion around both edges of an effective band; and
   a compensator for generating a completed channel estimation value by multiplying a channel estimation value generated by interpolating in the frequency axis, by the at least one compensation coefficient.

2. The apparatus of claim 1, wherein the determiner determines compensation coefficients for each of a plurality of symbols, and determines one compensation coefficient for each of a plurality of frequency sections that are divided, based on a pilot signal, within one symbol.

3. The apparatus of claim 2, wherein the determiner determines an error value using a difference between the channel estimation values estimated through the pilot signals and a completed channel estimation value obtained from a previous symbol, and updates a compensation coefficient determined in the previous symbol using the error value.

4. The apparatus of claim 3, wherein the determiner determines the one compensation coefficient for each of the plurality of frequency sections based on:

$$C_{n,k_p/12} = C_{n-1,k_p/12} + \mu(\hat{H}_{LS,n,k_p} - T_{n-1,k_p} \hat{H}_{FI,n,k_p}) \cdot \hat{H}_{FI,n,k_p}^*, k_p \in P,$$

where $C_{n,k_p/12}$ denotes a compensation coefficient of a frequency section including a $k_p$-th subcarrier carrying a pilot signal in an n-th symbol, $\mu$ denotes a weight of the error value, $\hat{H}_{LS,n,k_p}$ denotes a Least Square (LS) channel estimation value of the $k_p$-th subcarrier carrying the pilot signal in the n-th symbol, $T_{n-1,k_p}$ denotes a compensation coefficient of the $k_p$-th subcarrier in an (n−1)-th symbol, $\hat{H}_{FI,n,k_p}$ denotes a frequency-interpolated channel estimation value of the $k_p$-th subcarrier carrying the pilot signal in the n-th symbol, $k_p$ denotes an index of the subcarrier carrying the pilot signal, and P denotes a set of subcarriers carrying the pilot signal.

5. The apparatus of claim 2, further comprising:
   a compensation coefficient interpolator for generating compensation coefficients corresponding to each of a plurality of subcarriers within each of the frequency sections, by interpolating using compensation coefficients determined by the determiner.

6. The apparatus of claim 5, wherein the compensation coefficient interpolator generates the compensation coefficients based on:

$$T_{n,k} = C_{n,k/12}, \quad k \in 12m + 6$$
$$= T_{n,j} + (k - j) \cdot (T_{n,j+12} - T_{n,j})/12, \quad k \notin 12m + 6 \quad \text{and}$$
$$j = 12 \cdot \text{floor}[(k - 6)/12] + 6$$

where $T_{n,k}$ denotes a compensation coefficient of a k-th subcarrier in the n-th symbol, $C_{n,k/12}$ denotes a compensation coefficient of a frequency section including the k-th subcarrier in the n-th symbol, and m, which is 0 or a positive integer, denotes an index of the frequency section.

7. The apparatus of claim 1, further comprising:
   an expander for expanding, up to a guard band, channel estimation values used to interpolate in the frequency axis.

8. The apparatus of claim 7, wherein the expander inserts one of an average value of channel estimation values of a predefined number of subcarriers near the guard band, and a channel estimation value of an outermost subcarrier of the effective band, into the guard band.

9. The apparatus of claim 8, wherein the expander removes a phase values from the channel estimation values of the predefined number of subcarriers near the guard band, based on a timing offset of a Fast Fourier Transform (FFT) operation, calculates the average value using the channel estimation values without the phase values, and assigns new phase values to the average value inserted into the guard band.

10. The apparatus of claim 9, wherein the expander determines the channel estimation value inserted into the guard band based on:

$$\hat{H}_{FI_{in},k_{out}} = \underset{k_{in} \in P_{in}}{AVG} \left\{ \hat{H}_{FI_{in},k_{in}} \cdot \exp\left[-j2\pi\left(k_{in} - \frac{N_{SC}}{2}\right) \cdot \frac{\alpha}{N}\right] \right\} \cdot \exp\left[j2\pi\left(k_{out} - \frac{N_{SC}}{2}\right) \cdot \frac{\alpha}{N}\right],$$
$$k_{out} \in P_{out}$$

where $\hat{H}_{FI_{in},k_{out}}$ denotes a channel estimation value to be inserted into a k-th subcarrier in the guard band, $k_{in}$ denotes the k-th subcarrier in the effective band, $P_{in}$ denotes a set of subcarrier indexes carrying the outermost pilot signal in the effective band, $\hat{H}_{FI_{in},k_{in}}$ denotes a channel estimation value of the k-th subcarrier in the effective band, $N_{SC}$ denotes the number of the subcarriers, N denotes an FFT size, $\alpha$ denotes the timing offset of the FFT operation, and $P_{out}$ denotes a subcarrier index to comprise the pilot signal in the guard band, in case of the effective band.

11. The apparatus of claim 7, wherein the expander operates when a multipath component of a channel falls below a threshold.

12. A method of operating a receiver in a wireless communication system, the method comprising:
   interpolating in a frequency axis using at least one of channel estimation values estimated through pilot signals and channel estimation values generated using a time-axis interpolation;
   determining at least one compensation coefficient to compensate for edge distortion using the channel estimation values estimated through the pilot signals, wherein the edge distortion indicates distortion around both edges of an effective band; and
   generating a completed channel estimation value by multiplying a channel estimation value generated by interpolating in the frequency axis, by the at least one compensation coefficient.

13. The method of claim 12,
   wherein the determining of the at least one compensation coefficient comprises:

determining compensation coefficients for each of a plurality of symbols; and determining one compensation coefficient for each of a plurality of frequency sections that are divided, based on a pilot signal, within one symbol.

14. The method of claim 13, wherein determining the one compensation coefficient for each of the plurality of frequency sections comprises:

determining an error value using a difference between the channel estimation values estimated through the pilot signals and a completed channel estimation value obtained from a previous symbol; and updating a compensation coefficient determined in the previous symbol using the error value.

15. The method of claim 14, wherein the one compensation coefficient for each of the plurality of frequency sections is determined based on:

$$C_{n,k_p/12} = C_{n-1,k_p/12} + \mu(\hat{H}_{LS,n,k_p} - T_{n-1,k_p} \cdot \hat{H}_{FI,n,k_p}) \cdot \hat{H}_{FI,n,k_p}^*, k_p \in P$$

where $C_{n,k_p/12}$ denotes a compensation coefficient of a frequency section comprising a $k_p$-th subcarrier carrying a pilot signal in an n-th symbol, $\mu$ denotes a weight of the error value, $\hat{H}_{LS,n,k_p}$ denotes a Least Square (LS) channel estimation value of the $k_p$-th subcarrier carrying the pilot signal in the n-th symbol, $T_{n-1,k_p}$ denotes a compensation coefficient of the $k_p$-th subcarrier in an (n−1)-th symbol, $\hat{H}_{FI,n,k_p}$ denotes a frequency-interpolated channel estimation value of the $k_p$-th subcarrier carrying the pilot signal in the n-th symbol, $k_p$ denotes an index of the subcarrier carrying the pilot signal, and P denotes a set of subcarriers carrying the pilot signal.

16. The method of claim 13, further comprising:

generating compensation coefficients corresponding to each of a plurality of subcarriers in each of the frequency sections, by interpolating using compensation coefficients for each of the plurality of frequency sections.

17. The method of claim 16, wherein the compensation coefficients are generated based on:

$$T_{n,k} = C_{n,k/12}, \ k \in 12m+6$$
$$= T_{n,j} + (k-j) \cdot (T_{n,j+12} - T_{n,j})/12, \ k \notin 12m+6 \text{ and}$$
$$j = 12 \cdot \text{floor}[(k-6)/12] + 6$$

where $T_{n,k}$ denotes a compensation coefficient of a k-th subcarrier in the n-th symbol, $C_{n,k/12}$ denotes a compensation coefficient of a frequency section comprising the k-th subcarrier in the n-th symbol, and m, which is 0 or a positive integer, denotes an index of the frequency section.

18. The method of claim 12, further comprising:

before interpolating in the frequency axis, expanding, up to a guard band, channel estimation values used to interpolate in the frequency axis.

19. The method of claim 18, wherein expanding the channel estimation values up to the guard band comprises:

inserting an average value of channel estimation values of a predefined number of subcarriers near the guard band, or a channel estimation value of an outermost subcarrier of the effective band, into the guard band.

20. The method of claim 19, wherein expanding the channel estimation values up to the guard band comprises:

removing phase values from the channel estimation values of the predefined number of subcarriers near the guard band, based on a timing offset of a Fast Fourier Transform (FFT) operation;

calculating the average value using the channel estimation values without the phase values; and assigning new phase values to the average value inserted into the guard band.

21. The method of claim 20, wherein the channel estimation value inserted into the guard band is determined based on:

$$\hat{H}_{FI_{in},k_{out}} = \underset{k_{in} \in P_{in}}{AVG} \left\{ \hat{H}_{FI_{in},k_{in}} \cdot \exp\left[-j2\pi\left(k_{in} - \frac{N_{SC}}{2}\right) \cdot \frac{\alpha}{N}\right] \right\} \cdot \exp\left[j2\pi\left(k_{out} - \frac{N_{SC}}{2}\right) \cdot \frac{\alpha}{N}\right],$$
$$k_{out} \in P_{out}$$

where $\hat{H}_{FI_{in},k_{out}}$ denotes a channel estimation value to be inserted into a k-th subcarrier in the guard band, $k_{in}$ denotes the k-th subcarrier in the effective band, $P_{in}$ denotes a set of subcarrier indexes carrying the outermost pilot signal in the effective band, $\hat{H}_{FI_{in},k_{in}}$ denotes a channel estimation value of the k-th subcarrier in the effective band, $N_{SC}$ denotes the number of the subcarriers, N denotes an FFT size, α denotes the timing offset of the FFT operation, and $P_{out}$ denotes a subcarrier index to comprise the pilot signal in the guard band, in case of the effective band.

22. The method of claim 18, wherein expanding the channel estimation values up to the guard band is performed when a multipath component of a channel falls below a threshold.

* * * * *